US009120676B2

(12) United States Patent
Miller

(10) Patent No.: US 9,120,676 B2
(45) Date of Patent: Sep. 1, 2015

(54) GRAPHENE PRODUCTION

(75) Inventor: Seth Adrian Miller, Englewood, CO (US)

(73) Assignee: Empire Technology Development LLC, Wilmington, DE (US)

( * ) Notice: Subject to any disclaimer, the term of this patent is extended or adjusted under 35 U.S.C. 154(b) by 2 days.

(21) Appl. No.: 13/641,908

(22) PCT Filed: Mar. 6, 2012

(86) PCT No.: PCT/US2012/027868
§ 371 (c)(1),
(2), (4) Date: Oct. 18, 2012

(87) PCT Pub. No.: WO2013/133803
PCT Pub. Date: Sep. 12, 2013

(65) Prior Publication Data
US 2013/0315814 A1 Nov. 28, 2013

(51) Int. Cl.
C01B 31/04 (2006.01)
B01J 19/22 (2006.01)
B82Y 30/00 (2011.01)
B82Y 40/00 (2011.01)

(52) U.S. Cl.
CPC ............. *C01B 31/0446* (2013.01); *B01J 19/22* (2013.01); *B82Y 30/00* (2013.01); *B82Y 40/00* (2013.01)

(58) Field of Classification Search
None
See application file for complete search history.

(56) References Cited

U.S. PATENT DOCUMENTS

| 2010/0237296 | A1 | 9/2010 | Gilje | |
|---|---|---|---|---|
| 2010/0301279 | A1 | 12/2010 | Nesper et al. | |
| 2010/0303706 | A1 | 12/2010 | Wallace et al. | |
| 2013/0122220 | A1* | 5/2013 | Won et al. | 427/595 |
| 2013/0337170 | A1* | 12/2013 | Li | 427/248.1 |
| 2014/0054505 | A1* | 2/2014 | Tse et al. | 252/373 |

FOREIGN PATENT DOCUMENTS

| CN | 101830458 A | 9/2010 |
|---|---|---|
| CN | 102030325 A | 4/2011 |
| CN | 102107871 A | 6/2011 |

(Continued)

OTHER PUBLICATIONS

Mohsen Moazzami Gudarzi and Farhad Sharif. "Self assembly of graphene oxide at the liquid-liquid interface: A new route to the fabrication of graphene based composites". Soft Matter , 2011, 7, 3432-3440.*

(Continued)

*Primary Examiner* — Dah-Wei D Yuan
*Assistant Examiner* — Jethro M Pence
(74) *Attorney, Agent, or Firm* — Moritt Hock & Hamroff LLP; Steven S. Rubin, Esq.

(57) ABSTRACT

Technologies described herein are generally related to graphene production. In some examples, a system is described that may include a first container, a second container, and/or a chamber. The first container may include a first solution with a reducing agent, while the second container may include a second solution with graphene oxide. The chamber may be in operative relationship with the first and the second containers, and configured effective to receive the first and second solutions and provide reaction conditions that facilitate contact of the first and second solutions at an interfacial region sufficient to produce graphene at the interfacial region.

18 Claims, 5 Drawing Sheets

(56) References Cited

FOREIGN PATENT DOCUMENTS

| | | | |
|---|---|---|---|
| CN | 102153078 | A | 8/2011 |
| CN | 102219210 | A | 10/2011 |
| CN | 102225754 | A | 10/2011 |
| WO | 2009049375 | A1 | 4/2009 |
| WO | 2011119961 | A2 | 9/2011 |

OTHER PUBLICATIONS

S. Stankovich et al., Synthesis of graphene-based nanosheets via chemical reduction of exfoliated graphite oxide, Carbon 45, 2007, 1558-1565.

V. Lopez et al., Chemical Vapor Deposition Repair of Graphene Oxide: A Route to Highly-Conductive Graphene Momolayers, Adv. Mater., 2009, 1-4, 21.

Y. Zhu, Transparent self-assembled films of reduced graphene oxide platelets, Applied Physics Letters, 2009, 103-104.

A. B. Bourlinos et al., Graphite Oxide: Chemical Reduction to Graphite and Surface Modification with Primary Aliphatic Amines and Amino Acids, Langmuir, 2003, 6050-6055, 19.

S. Park et al., Colloidal Suspensions of Highly Reduced Graphene Oxide in a Wide Variety of Organic Solvents, Nano Lett., 2009, 1593-1597, 9 (4).

S Biswas and L. T. Drzal, A Novel Approach to Create a Highly Ordered Monolayer Film of Graphene Nanosheets at the Liquid-Liquid Interface, Nano Letters, 2009, 167-172, 9 (1).

D. L. Marc et al., Processable acqueous dispersions of graphene nanusheets, Nature Nonotechnology, 2008, 101-105, 3.

V. H. Pham et al., Fast and Simple fabrication of a large transparent chemically-converted graphene film by spray-coating, Carbon, 2010, 1945-1951, 48 (7).

V. C. Tung et al., High-throughput solution processing of large-scale graphene, Nature Nanotechnology, 2009, 25-29, 4.

International Search Report and Written Opinion for application with No. PCT/US2012/027868 dated Jun. 7, 2012, 5 pages.

\* cited by examiner

GRAPHENE PRODUCTION

CROSS REFERENCE TO RELATED APPLICATIONS

This application is a U.S. national stage filing under 35 U.S.C. §371 of International Application No. PCT/US2012/027868 filed Mar. 6, 2012, the entirety of which is hereby incorporated by reference.

BACKGROUND

Unless otherwise indicated herein, the materials described in this section are not prior art to the claims in this application and are not admitted to be prior art by inclusion in this section.

Graphene is a material that generally may include a one atom thick layer of bonded carbon atoms. Graphene may be formed by growing carbon atoms on top of another material such as copper. The copper may be inserted into a quartz tube, heated, and annealed. A gas mixture of $CH_4$ and $H_2$ may then be flowed into the tube and the copper may then be cooled with flowing $H_2$ to form graphene.

SUMMARY

In some examples, a system effective to produce graphene is generally described. In some examples, the system may include a first container, a second container, and/or a chamber. The first container may include a first solution. The first solution may include a reducing agent. The second container may include a second solution. The second solution may include graphene oxide. The chamber may be in operative relationship with the first and the second container. The chamber may be effective to receive the first and second solutions from the first and second containers, respectively and facilitate contact of the first and second solutions at an interfacial region under sufficient reaction conditions to produce graphene at the interfacial region.

In some examples, a method for producing graphene is generally described. The method may include receiving a first solution in a chamber. The first solution may include a reducing agent. The method may further include receiving a second solution in the chamber. The second solution may include graphene oxide. The method may further include contacting the first solution with the second solution in the chamber at an interfacial region under sufficient reaction conditions to produce graphene at the interfacial region.

In some examples, a chamber is generally described. The chamber may include a first solution. The first solution may include a reducing agent. The chamber may further include a second solution in contact with the first solution. The second solution may include graphene oxide. The chamber may further include graphene. The graphene may be at an interfacial region where the first solution contacts the second solution.

The foregoing summary is illustrative only and is not intended to be in any way limiting. In addition to the illustrative aspects, embodiments, and features described above, further aspects, embodiments, and features will become apparent by reference to the drawings and the following detailed description.

BRIEF DESCRIPTION OF THE FIGURES

The foregoing and other features of this disclosure will become more fully apparent from the following description and appended claims, taken in conjunction with the accompanying drawings. Understanding that these drawings depict only several embodiments in accordance with the disclosure and are, therefore, not to be considered limiting of its scope, the disclosure will be described with additional specificity and detail through use of the accompanying drawings, in which:

Figure 1:
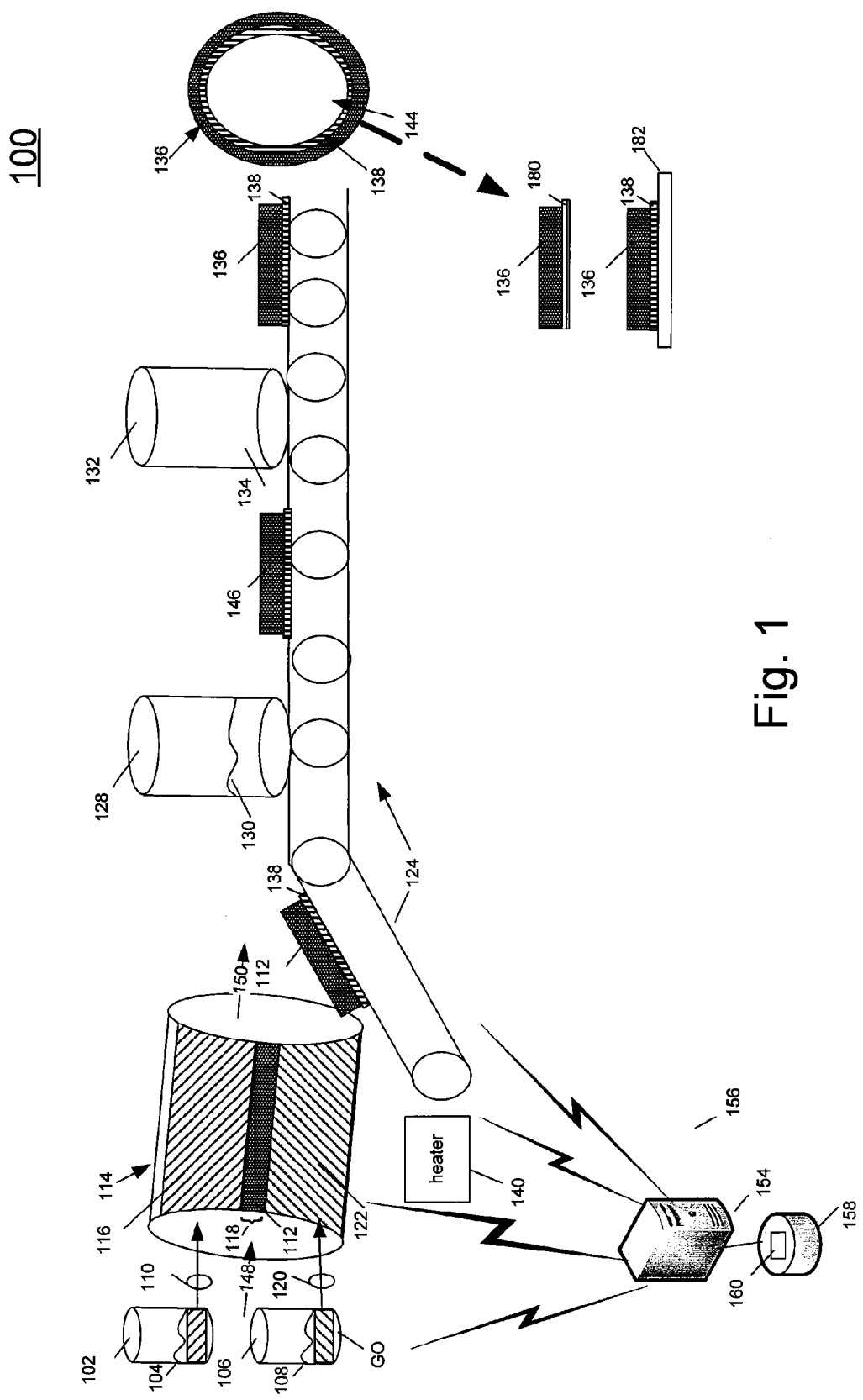
FIG. 1 illustrates an example system that can be utilized to produce graphene.

all arranged according to at least some embodiments described herein.

DETAILED DESCRIPTION

In the following detailed description, reference is made to the accompanying drawings, which form a part hereof. In the drawings, similar symbols typically identify similar components, unless context dictates otherwise. The illustrative embodiments described in the detailed description, drawings, and claims are not meant to be limiting. Other embodiments may be utilized, and other changes may be made, without departing from the spirit or scope of the subject matter presented herein. It will be readily understood that the aspects of the present disclosure, as generally described herein, and illustrated in the Figures, can be arranged, substituted, combined, separated, and designed in a wide variety of different configurations, all of which are explicitly contemplated herein.

This disclosure is generally drawn, inter alia, to systems, methods, materials and apparatus related to graphene production.

Briefly stated, technologies are generally described related to graphene production. In some examples, a system is described that may include a first container, a second container, and/or a chamber. The first container may include a first solution with a reducing agent, while the second container may include a second solution with graphene oxide. The chamber may be in operative relationship with the first and the second containers, and configured effective to receive the first and second solutions and provide reaction conditions that facilitate contact of the first and second solutions at an interfacial region sufficient to produce graphene at the interfacial region.

It will be understood that any compound, material or substance which is expressly or implicitly disclosed in the specification and/or recited in a claim as belonging to a group or structurally, compositionally and/or functionally related compounds, materials or substances, includes individual representatives of the group and all combinations thereof.

FIG. 1 illustrates an example system that can be utilized to implement graphene production in accordance with at least some embodiments described herein. An example graphene production system 100 may include a first container 102, a second container 106, a chamber 114, a conveyer belt 124, a wash chamber 128 and/or a heat chamber 132 all configured in operative relationship with respect to one another. At least some of elements of graphene production system 100 may be arranged in communication with a processor 154 through a communication link 156. In some examples, processor 154 may be adapted in communication with a memory 158 that may include instructions 160 stored therein. Processor 154 may be configured, such as by instructions 160, to control at least some of the operations/actions/functions described below.

As discussed in more detail below, a first solution 104 in first container 102 and a second solution 108 in second container 106 may be fed to an inlet port 148 of chamber 114 under control of, for example, processor 154. While in chamber 114, first solution 104 may react with second solution 108 at an interfacial region 118 where first solution 104 and second solution 108 contact, to produce graphene 112. Graphene 112 may be drawn out of an outlet port 150 of chamber 114, such as under control of processor 154, on a support 138 and fed through washing chamber 128 and heat chamber 132 by conveyer belt 124 to produce processed graphene 136.

First container 102 may include first solution 104 contained therein. Second container 106 may include second solution 108 contained therein. In an example, second solution 108 may include graphene oxide dispersed in an aqueous solution such as water. Other example aqueous solutions may include polar organic solvents such as N,N-dimethylformamide (DMF), N-methyl-2-pyrrolidone (NMP), tetrahydrofuran (THF), ethylene glycol (EG), propylene carbonate, or mixtures of polar solvents or mixtures of polar solvents and water. First and second solutions 104, 108 may have different densities. For example, first or second solution 104, 108 may include a viscosity enhancer that may be used to reduce mixing such as a water soluble polymer like dextrose, polyethylene oxide, polyvinyl alcohol, etc.

In an example, first solution 104 may include a reducing agent. First solution 104 may include a water-immiscible solvent, such as a solvent that may phase separate from the water upon mixing, including a reducing agent. An example reducing agent may include chloroform, ethyl ether, ethyl acetate, toluene, hexanes, dichloromethane, etc. The reducing agent may include water insoluble compounds. For example, first solution 104 may include reducing agents such as hydrazine, alkylhydrazines, organic-soluble reducing agents such as toluene, dichloromethane, alkylboranes, 9-BBN (9-Borabicyclo(3.3.1)nonane), hydroquinones, borohydrides, etc.

In some examples, in second solution 108, graphene oxide may be substantially homogenously dispersed in a polar medium such as water. For example, a concentration of graphene oxide in second solution 108 may be in a concentration range from about 0.1 g/liter to about 1 g/liter. In some examples, second solution 108 may include a surfactant that may facilitate the reduction of graphene oxide to graphene as is discussed herein. Example surfactants may include sodium dodecyl sulfate, TRITON X-100, MASON CS-428. In an example, second solution 108 may include graphene oxide in a non-aqueous media such as DMF (dimethylformamide). In an example, second solution 108 may be dispersed in an organic solvent such as chloroform.

First solution 104 may be fed to chamber 114 through port 110 such as by control of processor 154. Similarly, second solution 108 may be fed to chamber 114 through port 120 such as by control of processor 154. Ports 110, 120 may be configured to provide laminar extrusion type flow of solutions 104, 108. First solution 104 may be fed above, to the side and/or below second solution 108 in chamber 114.

Once inside chamber 114, solutions 104 and 108 may define interfacial region 118 where molecules of first solution 104 may react with molecules of second solution 108. First and second solutions 104, 108 may be fed through chamber 114 such as by pitching outlet port 150 of chamber 114 downward with respect to inlet port 148 so that a gravitation pull on chamber 114 may move solutions 104, 108 through chamber 114. Processor 154 may control ports 110, 120 to generate a pressure differential with respect to outlet 150 to move solutions 104, 108 through chamber 114.

Chamber 114 may be controlled, such as by processor 154 controlling heater 140 in communication with chamber 114, to maintain a temperature in chamber 114 in a temperature range of about 18 degrees Celsius to about 60 degrees Celsius. Solutions 104 and 108 may remain in chamber 114 for a time period in a range of about 30 seconds to about 30 minutes. In some examples, chamber 114 may be open, or not enclosed, may have a pressure of about one atmosphere. In examples where solutions 104 and/or 108 may include a volatile organic material, chamber 114 may be an evaporation chamber.

In examples where first solution 104 and second solution 108 are fed into chamber 114, graphene 112 may be produced at interfacial region 118 due to reducing agents in first solution 104 reacting with second solution 108. Graphene oxide in second solution 108 may be reduced to graphene at interfacial region 118. Interfacial or surface tension forces from first solution 104 and second solution 108 may maintain graphene 112 in a planar configuration, such as flat, straight and/or not curved configuration. Graphene may precipitate from second solution 108 where second solution touches first solution 104 so that graphene 112 may have a planar configuration.

Due to the production graphene 112 at interfacial region 118, first solution 104 and second solution 108 may make produce graphene 112 that is relatively thin. As a thickness of graphene 112 increases, reducing agents in first solution 104 may be prevented from reacting with graphene oxide in second solution 108 due to the presence of graphene 112. As graphene precipitates, reduction of graphene oxide becomes blocked so that a continuous layer of graphene 112 may be produced.

Once graphene 112 is produced, graphene 112 may be drawn from chamber 114 by conveyer belt 124 onto support 138. In an example, van der Waals forces may cause graphene 112 to adhere to support 138. First and second solutions 104, 108 may separate from graphene 112 due to gravity as graphene 112 is drawn out of chamber 114. First and second solutions 104, 108 may be collected and recycled. Support 138 may be made of plastic such as a polymer, or a fluorocarbon, which may be flexible. Support 138 may be a metal sheet such as stainless steel. In examples where support 138 is a metal sheet, graphene 112 may be subsequently treated with a relatively high temperature such as may occur in a chemical vapor deposition process.

Graphene 112 may be fed to wash chamber 128. Wash chamber 128 may be configured to wash graphene 126 with a solution 130 for a time period in a range of about 10 seconds to about 20 seconds. Solution 130 may be, for example, de-ionized water, water plus organic materials, isopropyl alcohol, etc. A temperature of container 128 may be controlled, such as by processor 154 controlling heater 140, to about 15 degrees Celsius to about 30 degrees Celsius and container 128 may be open and have a pressure of about one atmosphere.

After washing by wash chamber 128, washed graphene 146 may be fed by conveyer belt 124 to heat chamber 132. Heat chamber 132 may be configured to dry washed graphene 146 to produce processed graphene 136. For example, heat chamber 132 may be configured to dry washed graphene 146 at a temperature of about 15 degrees Celsius to about 30 degrees Celsius for a time period in a range of about 3 minutes to about 20 minutes. Processed graphene 136 may be stored on support 138 and/or rolled on a spool 144. Processed graphene 136 may then be applied to another substrate 180 such as silicon, glass, plastic, etc. Processed graphene 136 may be maintained on support 138 and the combination may be laminated onto a final substrate 182 such as in a lamination process.

Among other potential benefits, a system arranged in accordance with the present disclosure may be used for graphene production, which may be effective to produce a planar sheet of graphene. A geometry of the produced graphene may be maintained as it is collected and the graphene may be rolled on to a polymer support and may be transferred in this conformation for later use. Graphene may be produced and used in a gas permeation barrier where a thin sheet of graphene is used. Graphene may be produced in a continuous process such as may be used in an industrial or manufacturing setting. Produced graphene may be used in displays, electrostatic discharge protection, electromagnetic field shielding semiconductor materials, a gas barrier, solar cells, etc. Graphene may be produced, subsequently handled, protected during storage and transport and may be transferred to a final substrate.

Figure 2:
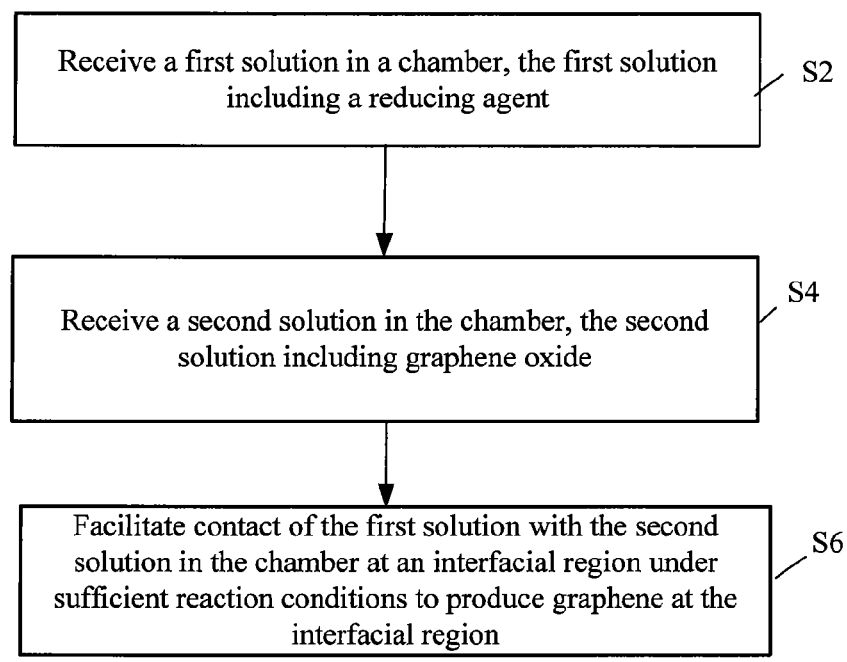
FIG. 2 depicts a flow diagram for an example process for producing graphene.

FIG. 2 depicts a flow diagram for an example process 200 for implementing graphene production arranged in accordance with at least some embodiments described herein. The process in FIG. 2 could be implemented using, for example, system 100 discussed above. An example process may include one or more operations, actions, or functions as illustrated by one or more of blocks S2, S4, and/or S6. Although illustrated as discrete blocks, various blocks may be divided into additional blocks, combined into fewer blocks, or eliminated, depending on the desired implementation.

Process 200 may begin at block S2, "Receive a first solution in a chamber, the first solution including a reducing agent." At block S2, a chamber may be configured effective to receive a solution including a reducing agent such as by a processor controlling a port where the port is in communication with a container including the reducing agent. For example, the reducing agent may be hydrazine, alkylhydrazines, organic-soluble reducing agents such as toluene, dichloromethane, alkylboranes, 9-BBN (9-Borabicyclo (3.3.1)nonane), hydroquinones, borohydrides, etc. The first solution may include a viscosity enhancer to reduce mixing between the first and second solutions. For example, the viscosity enhancer may include a water soluble polymer like dextrose, polyethylene oxide, polyvinyl alcohol, etc.

Processing may continue from block S2 to block S4, "Receive a second solution in the chamber, the second solution including graphene oxide." In block S4, the chamber may be configured effective to receive a second solution including graphene oxide such as by a processor controlling a port in communication with a container including the second solution. The second solution may include a viscosity enhancer and/or surfactant. The viscosity enhancer may reduce mixing between the first and second solutions. The surfactant may be effective to facilitate the reduction of graphene oxide to graphene as discussed herein.

Processing may continue from block S4 to block S6, "Facilitate contact of the first solution with the second solution in the chamber at an interfacial region under sufficient reaction conditions to produce graphene at the interfacial region." At block S6, the chamber may be effective to facilitate contact between the first solution with the second solution at an interfacial region. Under sufficient reaction conditions, graphene may be produced as described previously.

Figure 3:
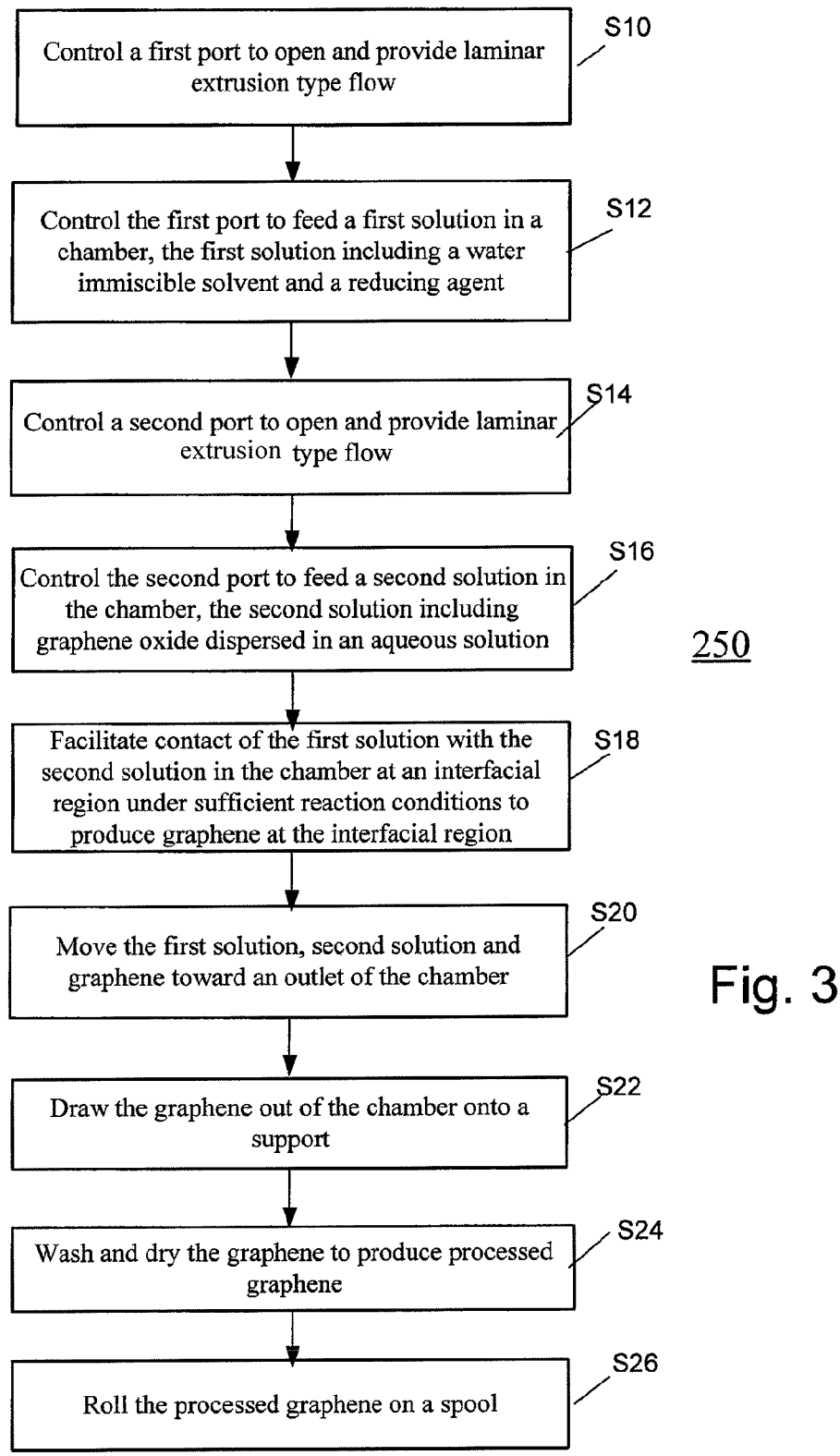
FIG. 3 depicts a flow diagram for an example process for producing graphene.

FIG. 3 depicts a flow diagram for an example process 250 for implementing graphene production arranged in accordance with at least some embodiments described herein. The process in FIG. 3 could be implemented using, for example, system 100 discussed above. An example process may include one or more operations, actions, or functions as illustrated by one or more of blocks S10, S12, S14, S16, S18, S20, S22, S24, and/or S26. Although illustrated as discrete blocks, various blocks may be divided into additional blocks, combined into fewer blocks, or eliminated, depending on the desired implementation.

Process 250 may begin at block S10, "Control a first port to open and provide laminar extrusion type flow." At block S10, a processor may be configured to open a first port and cause the first port to provide laminar extrusion type flow of a fluid.

Processing may continue from block S10 to block S12 "Control the first port to feed a first solution in a chamber, the first solution including a water immiscible solvent and a reducing agent." At block S12, the processor may be configured to control the first port to feed the first solution into a chamber using the laminar extrusion type flow. In an example, the reducing agent may be hydrazine, alkylhydrazines, organic-soluble reducing agents such as toluene, dichloromethane, alkylboranes, 9-BBN (9-Borabicyclo(3.3.1) nonane), hydroquinones, borohydrides, etc. The first solution may include a viscosity enhancer to reduce mixing between the first and second solutions. For example, the viscosity enhancer may include a water soluble polymer like dextrose, polyethylene oxide, polyvinyl alcohol, etc.

Processing may continue from block S12 to block S14, "Control a second port to open and provide laminar extrusion type flow." At block S14, a processor may be configured to open a second port and cause the second port to provide laminar extrusion type flow of a fluid.

Processing may continue from block S14 to block S16, "Control the second port to feed a second solution in the chamber, the second solution including graphene oxide dispersed in an aqueous solution." At block S16, the processor may be configured to control the second port to feed the second solution into the chamber using the laminar extrusion type flow. The second solution may include a viscosity enhancer and/or surfactant. The viscosity enhancer may reduce mixing between the first and second solutions. The surfactant may be effective to facilitate the reduction of graphene oxide to graphene as discussed herein.

Processing may continue from block S16 to block S18, "Facilitate contact of the first solution with the second solution in the chamber at an interfacial region under sufficient reaction conditions to produce graphene at the interfacial region." At block S18, the chamber may be effective to facilitate contact between the first solution and the second solution at an interfacial region. Under sufficient reaction conditions, graphene may be produced at the interfacial region as described herein.

Processing may continue from block S18 to block S20, "Move the first solution, second solution and graphene toward an outlet of the chamber." At block S20, the processor may be configured to control the chamber to move the first solution, second solution and graphene toward an outlet of the chamber. For example, the processor may control inlet and outlet ports of the chamber to generate a pressure differential effective to move the solutions toward an outlet of the chamber.

Processing may continue from block S20 to block S22, "Draw the graphene out of the chamber onto a support." At block S22, the processor may be effective to draw the graphene out of the chamber onto a support such as by controlling a conveyer belt to move a support in contact with the graphene.

Processing may continue from block S22 to block S24, "Wash and dry the graphene to produce processed graphene." At block S24, the processor may be configured to control one or more chambers to wash and dry the graphene, such as with application of de-ionized water and heat, to produce processed graphene.

Processing may continue from block S24 to block S26, "Roll the processed graphene on a spool." At block S26, the processor may be effective to control the conveyer belt and a roll to roll the processed graphene on a spool.

Figure 4:
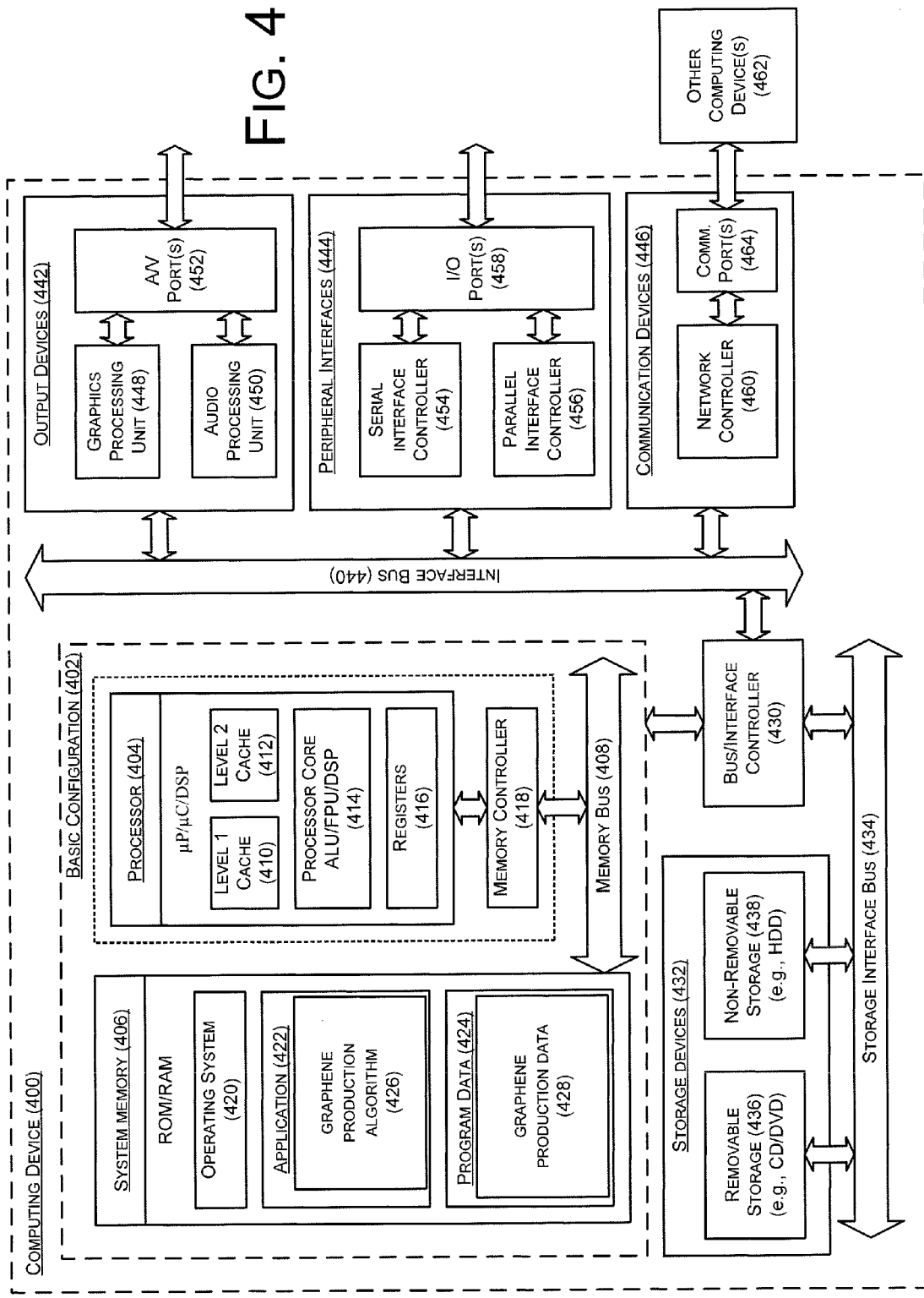
FIG. 4 illustrates a computer program product that can be utilized to produce graphene.

FIG. 4 illustrates a computer program product that can be utilized to implement graphene production in accordance with at least some embodiments described herein. Program product 300 may include a signal bearing medium 302. Signal bearing medium 302 may include one or more instructions 304 that, when executed by, for example, a processor, may provide the functionality described above with respect to FIGS. 1-3. Thus, for example, referring to system 100, processor 154 may undertake one or more of the blocks shown in FIG. 4 in response to instructions 304 conveyed to the system 100 by medium 302.

In some implementations, signal bearing medium 302 may encompass a computer-readable medium 306, such as, but not limited to, a hard disk drive, a Compact Disc (CD), a Digital Video Disk (DVD), a digital tape, memory, etc. In some implementations, signal bearing medium 302 may encompass a recordable medium 308, such as, but not limited to, memory, read/write (R/W) CDs, R/W DVDs, etc. In some implementations, signal bearing medium 302 may encompass a communications medium 310, such as, but not limited to, a digital and/or an analog communication medium (e.g., a fiber optic cable, a waveguide, a wired communications link, a wireless communication link, etc.). Thus, for example, program product 300 may be conveyed to one or more modules of the system 100 by an RF signal bearing medium 302, where the signal bearing medium 302 is conveyed by a wireless communications medium 310 (e.g., a wireless communications medium conforming with the IEEE 802.11 standard).

Figure 5:
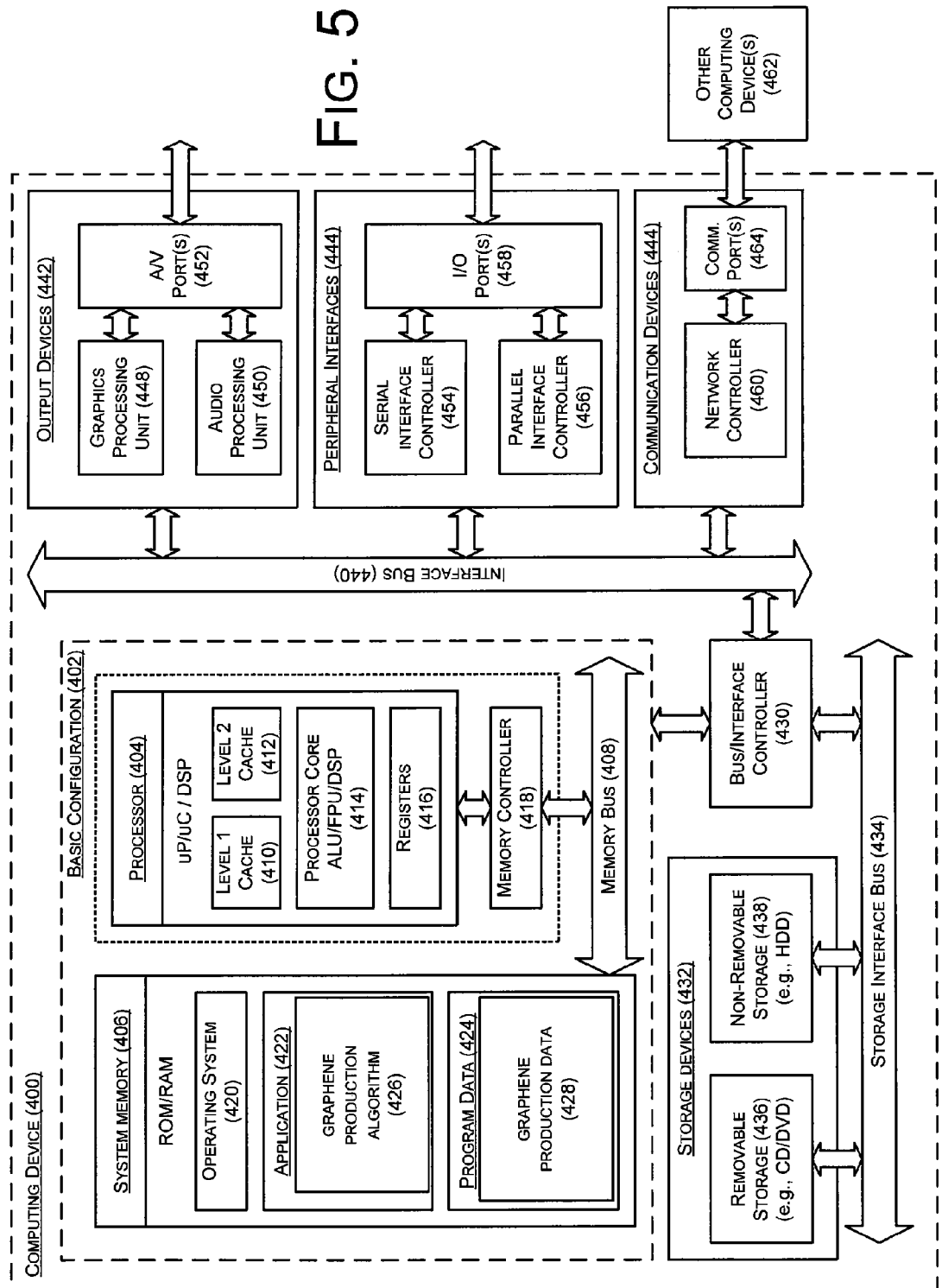
FIG. 5 is a block diagram illustrating an example computing device that is arranged to implement graphene production.
Figure 4:
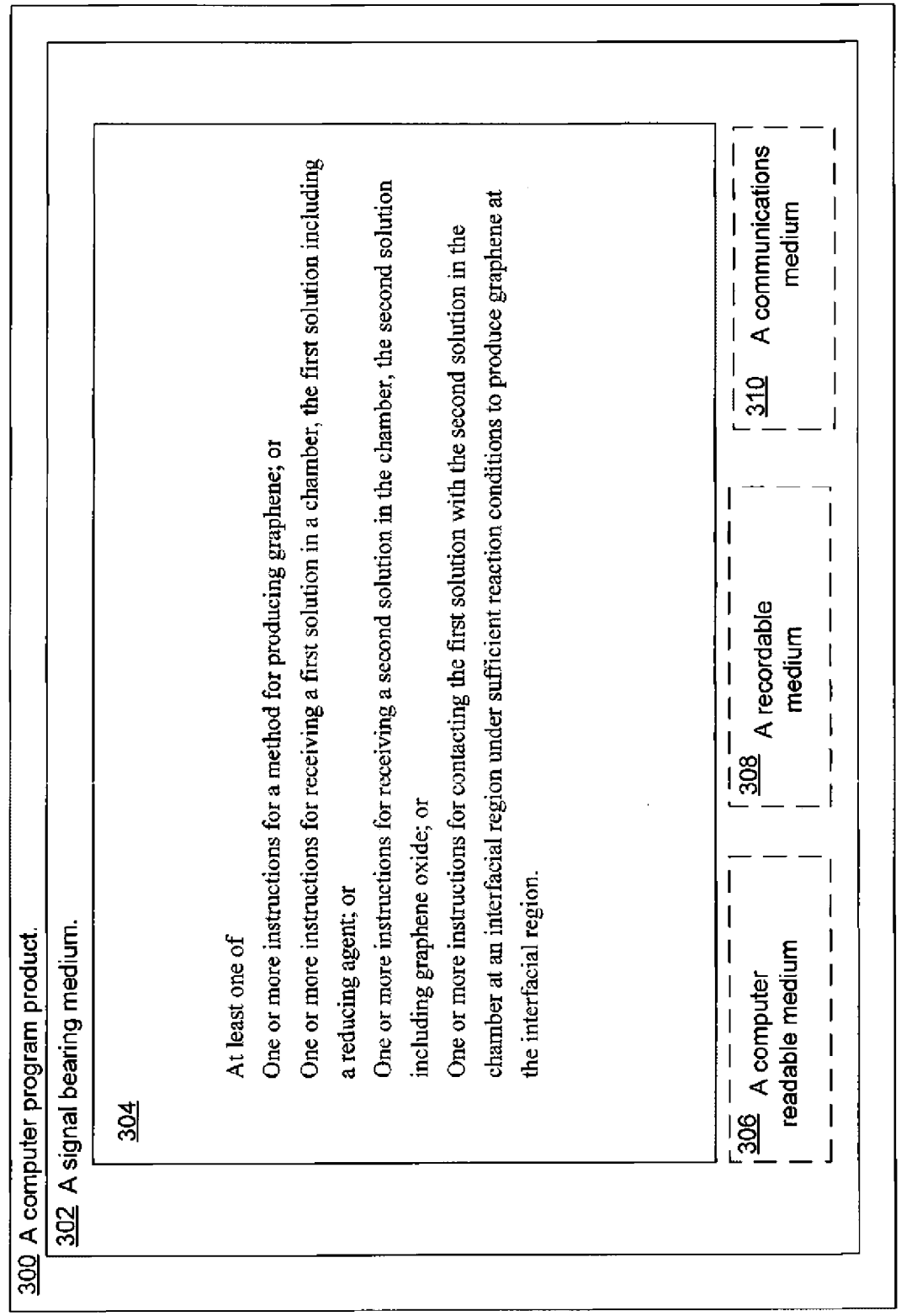

FIG. 5 is a block diagram illustrating an example computing device that is arranged to implement graphene production according to at least some embodiments described herein. In a very basic configuration 402, computing device 400 typically includes one or more processors 404 and a system memory 406. A memory bus 408 may be used for communicating between processor 404 and system memory 406.

Depending on the desired configuration, processor 404 may be of any type including but not limited to a microprocessor (μP), a microcontroller (μC), a digital signal processor (DSP), or any combination thereof. Processor 404 may include one more levels of caching, such as a level one cache 410 and a level two cache 412, a processor core 414, and registers 416. An example processor core 414 may include an arithmetic logic unit (ALU), a floating point unit (FPU), a digital signal processing core (DSP Core), or any combination thereof. An example memory controller 418 may also be used with processor 404, or in some implementations memory controller 418 may be an internal part of processor 404.

Depending on the desired configuration, system memory 406 may be of any type including but not limited to volatile memory (such as RAM), non-volatile memory (such as ROM, flash memory, etc.) or any combination thereof. System memory 406 may include an operating system 420, one or more applications 422, and program data 424. Application 422 may include a graphene production algorithm 426 that is arranged to perform the various functions/actions/operations as described herein including at least those described with respect to system 100 of FIGS. 1-3. Program data 424 may include graphene production data 428 that may be useful for implementing graphene production as is described herein. In some embodiments, application 422 may be arranged to operate with program data 424 on operating system 420 such that graphene production may be provided. This described basic configuration 402 is illustrated in FIG. 5 by those components within the inner dashed line.

Computing device 400 may have additional features or functionality, and additional interfaces to facilitate communications between basic configuration 402 and any required devices and interfaces. For example, a bus/interface controller 430 may be used to facilitate communications between basic configuration 402 and one or more data storage devices 432 via a storage interface bus 434. Data storage devices 432 may be removable storage devices 436, non-removable storage devices 438, or a combination thereof. Examples of removable storage and non-removable storage devices include magnetic disk devices such as flexible disk drives and hard-disk drives (HDD), optical disk drives such as compact disk (CD) drives or digital versatile disk (DVD) drives, solid state drives (SSD), and tape drives to name a few. Example computer storage media may include volatile and nonvolatile, removable and non-removable media implemented in any method or technology for storage of information, such as computer readable instructions, data structures, program modules, or other data.

System memory 406, removable storage devices 436 and non-removable storage devices 438 are examples of computer storage media. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which may be used to store the desired information and which may be accessed by computing device 400. Any such computer storage media may be part of computing device 400.

Computing device 400 may also include an interface bus 440 for facilitating communication from various interface devices (e.g., output devices 442, peripheral interfaces 444, and communication devices 446) to basic configuration 402 via bus/interface controller 430. Example output devices 442 include a graphics processing unit 448 and an audio processing unit 450, which may be configured to communicate to various external devices such as a display or speakers via one or more A/V ports 452. Example peripheral interfaces 444 include a serial interface controller 454 or a parallel interface controller 456, which may be configured to communicate with external devices such as input devices (e.g., keyboard, mouse, pen, voice input device, touch input device, etc.) or other peripheral devices (e.g., printer, scanner, etc.) via one or more I/O ports 458. An example communication device 446 includes a network controller 460, which may be arranged to facilitate communications with one or more other computing devices 462 over a network communication link via one or more communication ports 464.

The network communication link may be one example of a communication media. Communication media may typically be embodied by computer readable instructions, data structures, program modules, or other data in a modulated data signal, such as a carrier wave or other transport mechanism, and may include any information delivery media. A "modulated data signal" may be a signal that has one or more of its characteristics set or changed in such a manner as to encode information in the signal. By way of example, and not limitation, communication media may include wired media such as a wired network or direct-wired connection, and wireless media such as acoustic, radio frequency (RF), microwave, infrared (IR) and other wireless media. The term computer readable media as used herein may include both storage media and communication media.

Computing device 400 may be implemented as a portion of a small-form factor portable (or mobile) electronic device such as a cell phone, a personal data assistant (PDA), a personal media player device, a wireless web-watch device, a personal headset device, an application specific device, or a hybrid device that include any of the above functions. Computing device 400 may also be implemented as a personal computer including both laptop computer and non-laptop computer configurations.

The present disclosure is not to be limited in terms of the particular embodiments described in this application, which are intended as illustrations of various aspects. Many modifications and variations can be made without departing from its spirit and scope, as will be apparent to those skilled in the art. Functionally equivalent methods and apparatuses within the scope of the disclosure, in addition to those enumerated herein, will be apparent to those skilled in the art from the foregoing descriptions. Such modifications and variations are intended to fall within the scope of the appended claims. The present disclosure is to be limited only by the terms of the appended claims, along with the full scope of equivalents to which such claims are entitled. It is to be understood that this disclosure is not limited to particular methods, reagents, compounds compositions or biological systems, which can, of course, vary. It is also to be understood that the terminology used herein is for the purpose of describing particular embodiments only, and is not intended to be limiting.

With respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity.

It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to embodiments containing only one such recitation, even when the same claim includes the introductory phrases "one or more" or "at least one" and indefinite articles such as "a" or "an" (e.g., "a" and/or "an" should be interpreted to mean "at least one" or "one or more"); the same holds true for the use of definite articles used to introduce claim recitations. In addition, even if a specific number of an introduced claim recitation is explicitly recited, those skilled in the art will recognize that such recitation should be interpreted to mean at least the recited number (e.g., the bare recitation of "two recitations," without other modifiers, means at least two recitations, or two or more recitations). Furthermore, in those instances where a convention analogous to "at least one of A, B, and C, etc." is used, in general such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.). In those instances where a convention analogous to "at least one of A, B, or C, etc." is used, in general such a construction is intended in the sense one having skill in the art would understand the convention (e.g., "a system having at least one of A, B, or C" would include but not be limited to systems that have A alone, B alone, C alone, A and B together, A and C together, B and C together, and/or A, B, and C together, etc.). It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B."

In addition, where features or aspects of the disclosure are described in terms of Markush groups, those skilled in the art will recognize that the disclosure is also thereby described in terms of any individual member or subgroup of members of the Markush group.

As will be understood by one skilled in the art, for any and all purposes, such as in terms of providing a written description, all ranges disclosed herein also encompass any and all possible subranges and combinations of subranges thereof. Any listed range can be easily recognized as sufficiently describing and enabling the same range being broken down into at least equal halves, thirds, quarters, fifths, tenths, etc. As a non-limiting example, each range discussed herein can be readily broken down into a lower third, middle third and upper third, etc. As will also be understood by one skilled in the art all language such as "up to," "at least," "greater than," "less than," and the like include the number recited and refer to ranges which can be subsequently broken down into subranges as discussed above. Finally, as will be understood by one skilled in the art, a range includes each individual member. Thus, for example, a group having 1-3 cells refers to groups having 1, 2, or 3 cells. Similarly, a group having 1-5 cells refers to groups having 1, 2, 3, 4, or 5 cells, and so forth.

While various aspects and embodiments have been disclosed herein, other aspects and embodiments will be apparent to those skilled in the art. The various aspects and embodiments disclosed herein are for purposes of illustration and are not intended to be limiting, with the true scope and spirit being indicated by the following claims.

What is claimed is:

1. A system configured to produce graphene, the system comprising:
   a first container including a first solution, wherein the first solution has a first density and includes a water immiscible solvent including a reducing agent;
   a second container including a second solution, wherein the second solution has a second density, the second density being different from the first density and the second solution includes graphene oxide;
   a chamber in operative relationship with the first and the second container, the chamber arranged to:
   receive the first and second solutions from the first and second containers, respectively, where surface tension forces caused by a difference between the first and second densities cause the first and second solution to remain separate in the chamber except at a planar interfacial region where the first and second solutions contact; and facilitate contact of the first and second solutions at the planar interfacial region under sufficient reaction conditions to produce graphene in a planar configuration by reduction of the graphite oxide at the planar interfacial region.

2. The system as recited in claim 1, wherein the chamber includes an inlet and an outlet, and the system further comprises:

a first port in communication with the first container and the inlet of the chamber; and a second port in communication with the second container and the inlet of the chamber;

wherein the first and second ports are configured to create a pressure differential in the chamber sufficient to promote movement of the first and second solutions toward the outlet of the chamber.

3. The system as recited in claim 1, wherein:

the chamber includes an inlet and an outlet; and the outlet is pitched with respect to the inlet so that a gravitational force in the chamber is configured to promote movement of the first and second solutions toward the outlet of the chamber.

4. The system as recited in claim 1, wherein the second solution includes graphene oxide dispersed in a liquid, wherein the liquid comprises water, a polar organic solvent, N,N-dimethylformamide (DMF), N-methyl-2-pyrrolidone (NMP), tetrahydrofuran (THF), ethylene glycol (EG), propylene carbonate, and/or combinations or mixtures thereof.

5. The system as recited in claim 1, wherein the second solution includes graphene oxide dispersed in water with a concentration of the graphene oxide to water in a range of about 0.1 g/liter to about 1 g/liter.

6. The system as recited in claim 1, wherein the second solution includes one or more of a surfactant, graphene oxide in a non-aqueous medium, graphene oxide in dimethylformamide, graphene oxide dispersed in an organic solvent, and/or graphene oxide dispersed in chloroform.

7. The system as recited in claim 1, wherein the first or second solution includes a viscosity enhancer.

8. The system as recited in claim 1, wherein the first or second solution includes a water soluble polymer.

9. The system as recited in claim 1, wherein the first or second solution includes at least one of dextrose, polyethylene oxide, and/or polyvinyl alcohol.

10. The system as recited in claim 1, wherein:

wherein the second solution includes graphene oxide dispersed in water; and the first solution is immiscible with the water.

11. The system as recited in claim 1, wherein the reducing agent in the first solution includes at least one of hydrazine, alkyl hydrazine, toluene, dichloromethane, an alkyl borane, 9-Borabicyclo(3.3.1)nonane, a hydroquinone, and/or a borohydride.

12. The system as recited in claim 1, further comprising a conveyer belt in operative relationship with the chamber, wherein the conveyer belt is configured to draw the graphene out of the chamber on to a support.

13. The system as recited in claim 1, further comprising a conveyer belt in operative relationship with the chamber, wherein the conveyer belt is configured to draw the graphene out of the chamber on to a support, where the support is one of plastic, a polymer, a fluorocarbon or metal.

14. The system as recited in claim 1, further comprising:

a conveyer belt in operative relationship with the chamber, the conveyer belt configured to draw the graphene out of the chamber on to a support; and a spool in operative relationship with the conveyer belt, wherein the spool is configured to roll the graphene and the support onto the spool.

15. The system as recited in claim 1, wherein the chamber is a first chamber and the system further comprises a second chamber in operative relationship with the first chamber, wherein the second chamber is configured to receive and wash the graphene.

16. The system as recited in claim 1, wherein the chamber is a first chamber and the system further comprises:

a second chamber in operative relationship with the first chamber, wherein the second chamber is configured to receive and wash the graphene to produce washed graphene; and a third chamber in operative relationship with the second chamber, wherein the third chamber is configured to receive and dry the washed graphene to produce processed graphene.

17. The system as recited in claim 1, wherein the chamber is a first chamber and the system further comprises:

a second chamber in operative relationship with the first chamber, wherein the second chamber is configured to receive and wash the graphene to produce washed graphene; and a third chamber in operative relationship with the second chamber, wherein the third chamber is an evaporation chamber configured to receive and dry the washed graphene to produce processed graphene.

18. The system as recited in claim 1, wherein the reducing agent is one of chloroform, ethyl ether, ethyl acetate, toluene, hexane, and/or dichloromethane, or combinations thereof.

* * * * *

UNITED STATES PATENT AND TRADEMARK OFFICE
CERTIFICATE OF CORRECTION

| | |
|---|---|
| PATENT NO. | : 9,120,676 B2 |
| APPLICATION NO. | : 13/641908 |
| DATED | : September 1, 2015 |
| INVENTOR(S) | : Miller |

It is certified that error appears in the above-identified patent and that said Letters Patent is hereby corrected as shown below:

IN THE DRAWINGS

In Fig. 4, Sheet 4 of 5, delete FIG. 4 and insert the attached figure 4, therefor.

In Fig. 5, Sheet 5 of 5, for Tag "(444)", Line 1, delete "COMMUNICATION DEVICES 444" and insert -- COMMUNICATION DEVICES (446) --, therefor.

In Fig. 5, Sheet 5 of 5, delete "UP/UC/DSP" and insert -- $\mu P/\mu C/DSP$ --, therefor.

Signed and Sealed this
Eighth Day of March, 2016

Michelle K. Lee
*Director of the United States Patent and Trademark Office*